United States Patent [19]
Mitchell

[11] Patent Number: 5,738,399
[45] Date of Patent: Apr. 14, 1998

[54] CAT LITTER SCOOP

[76] Inventor: Melanie Mitchell, 6624 Wildwood Ct., San Jose, Calif. 95120

[21] Appl. No.: 735,519

[22] Filed: Oct. 23, 1996

[51] Int. Cl.$^6$ ............................................. A01K 29/00
[52] U.S. Cl. ........................ 294/1.3; 294/55; 209/418
[58] Field of Search .......................... 294/1.3–1.5, 9, 294/49, 55; 209/417–419; 15/257.1, 257.3; D30/162; 119/161, 166

[56] References Cited

U.S. PATENT DOCUMENTS

| | | | |
|---|---|---|---|
| 97,025 | 11/1869 | Beucus | 209/418 |
| D. 314,254 | 1/1991 | Gordon | D8/10 |
| 316,623 | 4/1885 | Hooper | D30/162 |
| D. 332,675 | 1/1993 | Simon | 294/1.3 |
| D. 347,497 | 5/1994 | VanSkiver | 294/1.3 |
| D. 360,714 | 7/1995 | D'Alquen | 294/1.3 |
| 751,197 | 2/1904 | Osgood | 209/419 |
| 1,094,161 | 4/1914 | Mueller | 209/419 |
| 4,988,005 | 1/1991 | Graham | 294/55 |
| 5,076,627 | 12/1991 | Simon | 294/1.3 |

OTHER PUBLICATIONS

Foster Smith 1994 Catalog, p. 36, long metal litter scoop, Item 5658.

*Primary Examiner*—Dean Kramer
*Attorney, Agent, or Firm*—Trial & Technology Law Group

[57] ABSTRACT

The present invention is a cat litter scoop for removing waste material from scoopable cat litter. The scoop includes a base portion, side panels and a back panel. The side and bottom panels are made of mesh so as to facilitate the separation of clumped waste material from cat litter. The mesh is designed to allow cat litter to fall through the mesh, while waste material is contained in the scoop for disposal. The scoop is designed to more easily and efficiently pick up the clumped material. The front edge of the scoop is formed so as to facilitate cleanup of the cat litter container. The handle of the scoop is designed for easier, more comfortable grasping and manipulation by the user.

4 Claims, 4 Drawing Sheets

CAT LITTER SCOOP

BACKGROUND OF THE INVENTION

The present invention relates generally to a cat litter scoop for removing waste material from a cat litter container, and more particularly, to a cat litter scoop for removing waste material from what is known as scoopable cat litter.

One task involved in caring for a house cat is cleaning the cat litter container. The waste material must regularly be separated from the cat litter. In addition, the mixture of cat litter and waste material which often adheres to the sides of the litter container must be removed.

A cat litter scoop includes a handle portion and a base or basket portion. The base portion may contain openings in either a slot or mesh structure through which the cat litter can be filtered.

Scoopable cat litter is now presently available. Such scoopable cat litter provides for a clumping action with waste material in a cat litter container to form what is called "clumped material." In order to use a cat litter scoop, the clumped material and clean cat litter is scooped into the base or basket portion. The scoop is then shaken to separate the clumped material from the clean litter such that the clean litter falls through the openings. The solid waste material remaining in the scoop is then discarded.

Prior art scoops do not effectively separate all clumped material from clean litter. A problem with slotted scoops, when used with scoopable litter, is that both clean litter and clumped material can fall through the slots.

Scoops with a mesh bottom and sides generally use a mesh that is too large, so that both clean litter and clumped material can fall through the scoop. Scoops that use a mesh bottom and slotted sides have the problems of both types of scoops, in that as the litter and clumped material are sifted, the clean litter and clumped material can fall through the slots at the sides.

Some prior art scoops arc made of flexible plastic. When the user attempts to scrape the litter container, the plastic bends and, therefore, can be ineffective in removing material stuck to the container. In addition, plastic scoops often have protruding edges that make it difficult to fit the scoop into the corners of the litter box for cleaning.

There are metal scoops which have rounded edges, which also can make it difficult to clean the sides of the litter container. Some plastic scoops are known which have a front beveled edge for cleaning the container. However, for the reasons discussed above, this type of scoop is ineffective for separating clean litter from clumped material and removing waste adhering to the container.

SUMMARY OF THE INVENTION

Accordingly, it is an object of the present invention to more efficiently capture clumped material into a cat litter scoop.

It is a further object of the present invention to facilitate the separation of waste material from cat litter.

It is another object of the present invention to more efficiently clean a cat litter container.

In one embodiment, the present invention includes an apparatus for removing clumped material from a cat litter container. The apparatus, a scoop, includes a base or basket portion and a handle which is slightly angled with respect to the bottom of the base. A portion of the sides and bottom of the base are made of mesh in order to sift clumped material from clean cat litter. The bottom front portion of the base is angled in order to facilitate the scooping of the clumped material and clean cat litter into the base. The back of the base is also narrower than the front, to further facilitate capture of the clumped material and clean cat litter mixture. The base portion also contains a front beveled angled edge and a top side edge which curves down to meet the front beveled angled edge to further facilitate capture of the clumped material.

Additional objects and advantages of the invention will be set forth in part in the description which follows, and in part become apparent to those skilled in the art upon examination of the following, or may be learned by practice of the invention. The objects and advantages of the invention may be realized and obtained by means of the instrumentalities and combinations particularly pointed out in the claims.

BRIEF DESCRIPTION OF THE DRAWINGS

The accompanying drawings, wherein like numerals indicate like elements and which are incorporated in and constitute a part of the specification, illustrate a preferred embodiment of the invention and, together with the following detailed description of a preferred embodiment, serve to explain the principles of the invention.

FIGS. 1A–3A show the same views as FIGS. 1–3, with the addition of desirable dimensions for the cat litter scoop of the present invention.

DESCRIPTION OF THE PREFERRED EMBODIMENT

Reference will now be made in detail to the preferred embodiment of the invention, an example of which is illustrated in the accompanying drawings. While the invention will be described in conjunction with that preferred embodiment, it will be understood that it is not intended to limit the invention to one preferred embodiment. On the contrary, it is intended to cover alternatives, modifications, and equivalents as may be included within the spirit and scope of the invention as defined by the appended claims.

Figure 1:
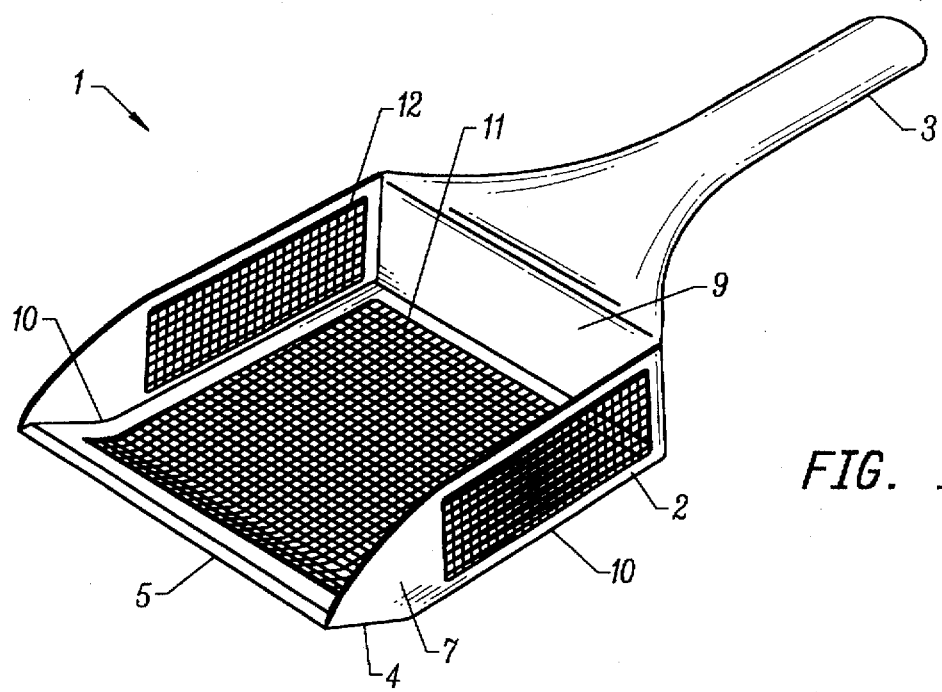
FIG. 1 is a diagram depicting the scoop according to the present invention.

Referring now to the drawings, in which like components are designated by like reference numerals, FIG. 1 shows a preferred embodiment of a scoop 1 according to the present invention. The scoop includes base or basket portion 2 and handle 3. The scoop is preferably made of metal so that it does not flex when scraping a cat litter container. The handle 3 is at a slight angle with respect to base portion 2 so as to provide a comfortable grip and wrist position for ease in manipulating the litter tool, while also assisting in the scooping action. The handle 3 is preferably rounded, partially hollow handle which is contoured to fit a user's hand for comfort and stability. A portion of the bottom 8 and sides 7 of base 2 is formed of a relatively fine mesh material 11, 12 to promote a sifting action, as will be described in more detail. The back or rear portion 9 of the basket 2 is preferably made of a solid material to provide more support for the scooping action (as contrasted with an all mesh configuration, which might not hold up as well with repeated usage). The solid rear portion 9 also serves to prevent the clumped material from being sifted back to the user's arm or hand.

A portion of the sides 7 are in the form of a relatively fine mesh window 12, as seen in FIG. 1. Also, the bottom edges 10 between the sides 7 and bottom of basket 2 are also formed of metal to provide further support in the scooping action.

Figure 2:
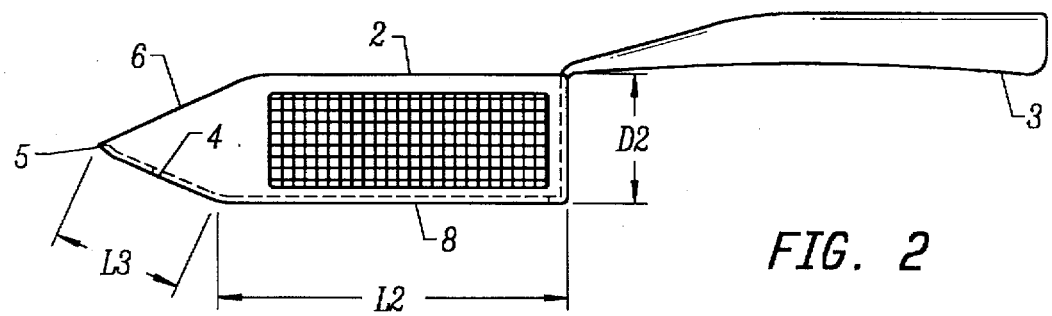
FIG. 2 displays a side-view of the scoop of FIG. 1.
Figure 3:
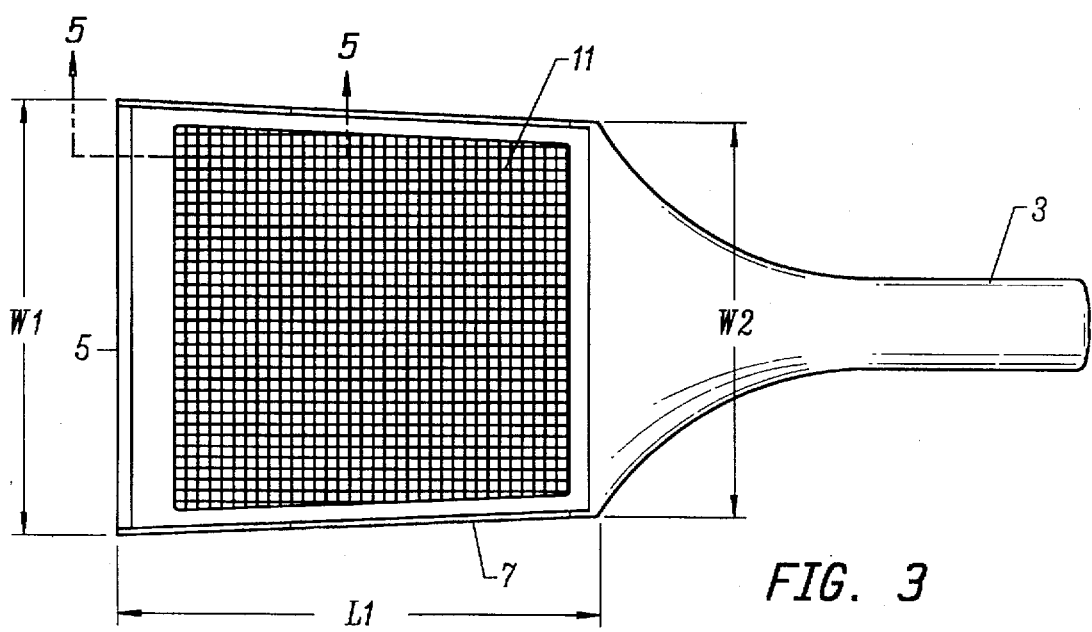
FIG. 3 is a diagram illustrating a top-view of the scoop of FIG. 1.
Figure 1A:
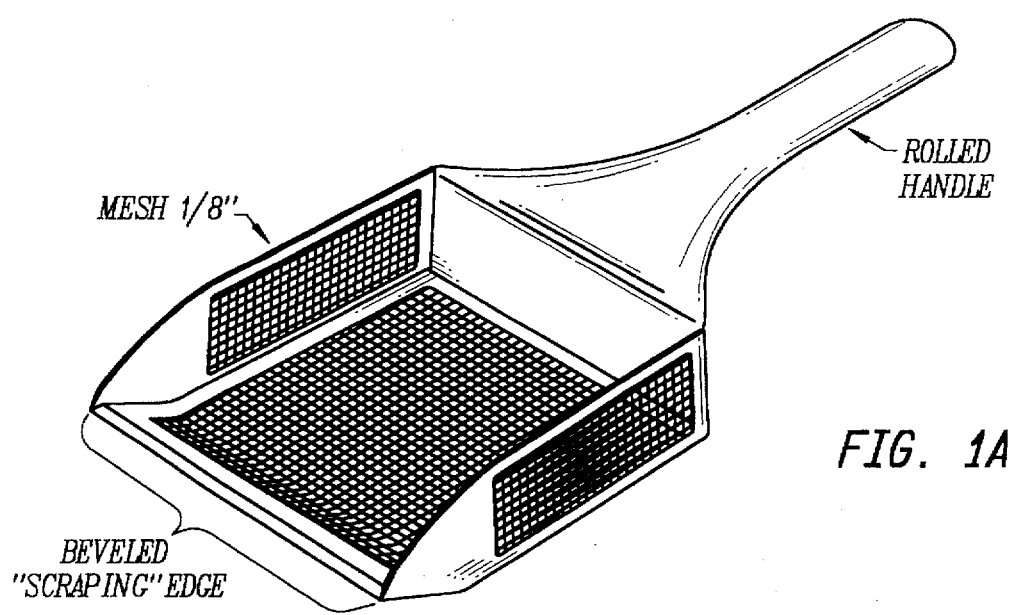
Figure 2A:
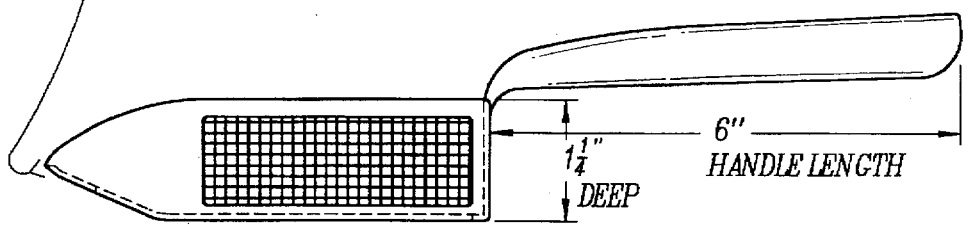
Figure 3A:
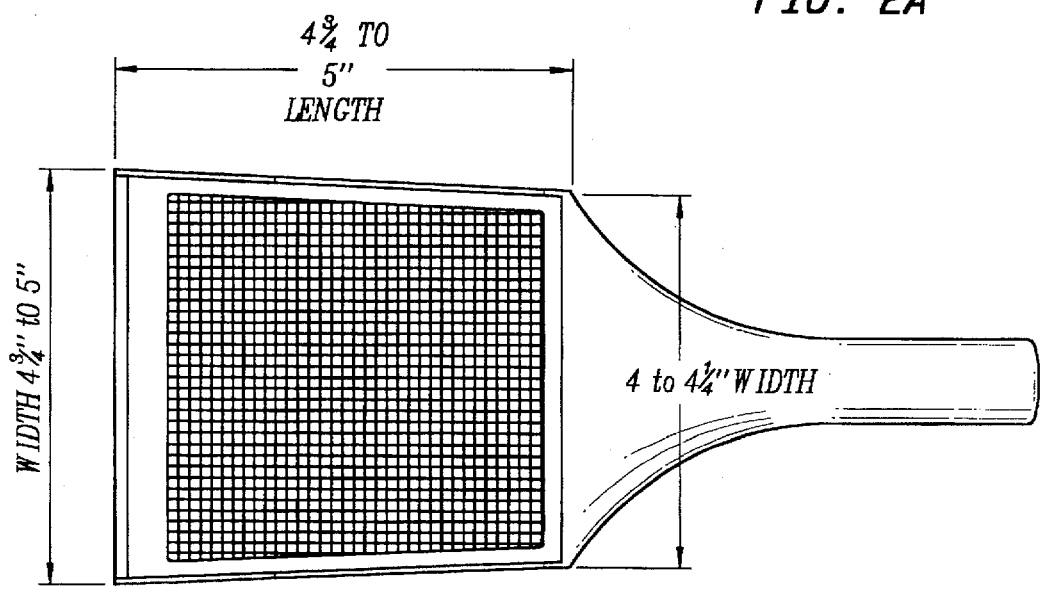

FIGS. 1A–3A show the same views of FIGS. 1–3, with suitable dimensions illustrated in FIGS. 2A–3A. FIG. 1A shows the rolled handle and the beveled scraping edge, together with the indication that the preferred mesh size is ⅛ inch. FIG. 2A shows a handle length of 6 inches and a basket depth of 1¼ inches, as well as the beveled scraping edge. FIG. 3A shows the dimensions of the cat litter tool with a front basket width of 4¾–5 inches; a basket length of 4.7–5 inches; and a rear or back basket width of 4–4¼ inches.

FIG. 2 shows a side view of other aspects of the invention according to a preferred embodiment. The front portion 4 of base 2 is angled with respect to the bottom 8. The beveled angle between front 4 and bottom 8 facilitates the scooping of clumped material and cat litter mixture into the base 2. This angle allows the user to utilize a smooth rocking motion to capture the mixture into base 2 of the scoop 1 as a user lifts the scoop 1. By using a sideward shaking motion, the mesh basket bottom 8 and sides 7 can sift clumps and small debris. This should be contrasted with prior art scoops where the clumps and small debris break off from clumping litter and can fall through back to the litter tray or container. It can be seen in FIGS. 1–3 that the handle 3 has an arch shape for further ease in handling.

FIG. 3 illustrates another aspect of the invention which aids in scooping clumped material and cat litter mixture into base 2. The width W1 of the front portion base 2 is wider than the width W2 of the back portion of base 2. This aspect of the scoop 1 creates a funnel-like structure which aids in funneling the waste material and cat litter mixture from the front end of the scoop 1 to the deeper, main base portion 8 of base 2.

Referring again to FIGS. 2 and 5, beveled angled edge 5 and top side edge 6 facilitate the cleaning of a cat litter container. Angled edge 5 provides a hard (solid) thin surface for removing stuck clumped material or cat litter from the sides or bottom of a litter container. To remove the clumped material, the user scrapes the sides or bottom of the litter container with the solid angled edge 5. The bevel of angled edge 5 also allows the scoop to get under the waste material once it has been scraped from the litter container. Top side edge 6 curves down to meet angled edge 5. The top side edge 6 of sides 7 of the tool 1 are smooth and slightly curved down to meet beveled edge 5 to enable the tool 1 to scrape corners of litter containers more easily. Hence, this provides more clearance near the front edge of the scoop 1 to aid in scraping the corners of the litter container.

Referring to FIGS. 2 and 3, sides 7 of base 2 do not have a protruding top edge, as contrasted with some prior art scoops. This also allows the scoop 1 to access the sides and corners of the litter container for scraping.

Handle 3 is angled with respect bottom 8 of base 2. This angle also facilitates use of the scoop. Because handle 3 is angled, the scoop has a more comfortable grip position for a user than a scoop in which the handle is parallel or perpendicular to bottom 8 of base 2. Thus, it is easier for the user to scoop the waste material and cat litter mixture from the container into the scoop and sift the mixture to separate the waste material from the cat litter. In addition, in a preferred embodiment, handle 3 has a rounded grip for greater user comfort.

As previously described, the main portion of base 2 is deeper than the front, creating a deeper basket at the center and back of base 2. In addition, bottom 8 and sides 7 of the base are made of a relatively fine mesh material, 11, 12, preferably ⅛ inch mesh. The side portion 7 is preferably in the shape of a rectangular window, as seen in FIGS. 1 and 2. It has been found that a mesh material is preferably of ⅛ inch mesh such that the size of the mesh is large enough to allow clean litter to pass through the mesh, but small enough to prevent clumped material (i.e., solid wastes and litter that has come into contact with liquid) from falling through the mesh. The depth D2 of base 2 and mesh bottom 8 and sides 7 facilitate the separation of clumped material from clean cat litter. In order to separate the clumped material from cat litter, the mixture of waste material and cat litter in base 2 is sifted. The depth of base 2, approximately 1¼ inch near the back portion, helps prevent the mixture from falling out of base 2 at the front edge during sifting. Note that this depth is not so large that base 2 interferes with the cleaning and scraping of the cat litter box. In addition, the width of base 2 is large enough to allow for scooping a significant amount of litter, but small enough so that the scoop can fit entirely within the litter container for ease in both scooping the waste material and litter mixture and scraping the sides of the container.

A common problem in connection with the removal of clumped material is that the movement from a litter box causes the clumped material to break up into small pieces of debris which can fall back into the litter box. The present invention provides a solution to this problem in that the mesh sides 7 and bottom 8 allow the mixture to be sifted using a side-to-side motion. This allows the clumped material and cat litter mixture to be sifted without allowing smaller clumps of debris that break off to fall back into the litter box unlike the prior art. Thus, cat litter falls through the mesh portions 12, 11 on sides 7 and bottom 8, leaving the clumped material in base 2 to be discarded. Also, the back or rear portion 9 of basket 2 is preferably solid so as to provide support in the scooping action, as well as to prevent the clumped material from being sifted back to the user's hand or arm.

Figure 5:
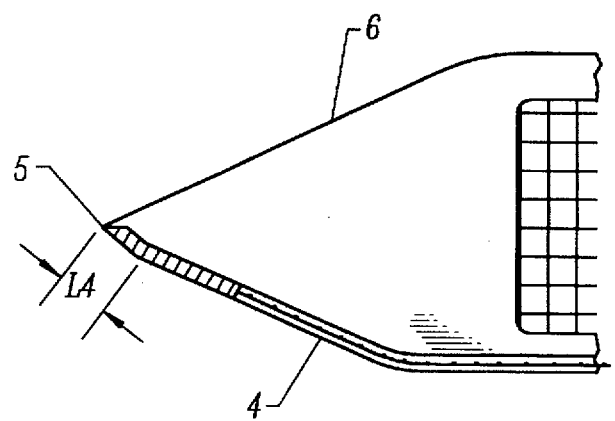
FIG. 5 is a more detailed side portion of the scoop taken along line 5—5 of FIG. 3 showing beveled edges.

In FIG. 5, the first beveled angled edge 5 of the present invention provides for scrapping stuck litter from sides or the bottom of a litter box, while the beveled edge 5 and second angle edge 4 facilitate a smooth rocking movement to capture litter and move the captured litter into the basket as lifted.

The top side edge 6 of the sides of the basket are smooth and slightly curved down to meet the beveled edge to enable the sifter to scrape corners of litter boxes more easily.

As seen in FIG. 3, in one embodiment, the width W1 of the front edge of the litter tool is approximately five inches, while the width W2 at the base near the handle is approximately four inches. This also facilitates the motion of the tool to move the captured litter into the basket as lifted. The length L1 of the basket in a preferred embodiment is approximately 4.7 inches.

Figure 4:
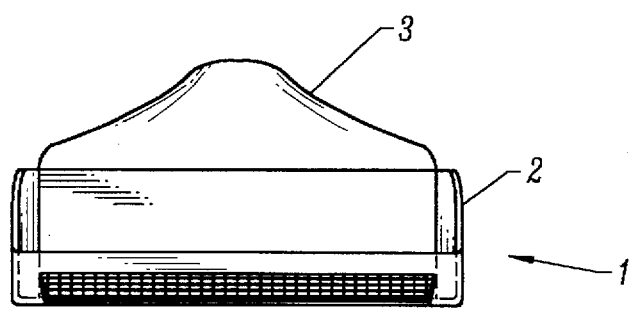
FIG. 4 is a diagram showing a cross sectional front view of the scoop of FIG. 1.

FIG. 4 shows a front view of the tool 1 and FIG. 5 shows a more detailed side portion of the scoop of FIG. 2, showing the beveled edges 4, 5 which facilitate the scooping and rocking motion as described above. The length L2 of the basket portion (FIG. 2) is approximately 3" and the length L3 of the front portion is approximately 1½" (this forms the second angle). The length L4 (FIG. 5) of beveled edge 5 is approximately 0.2 inch in length.

Figure 6:
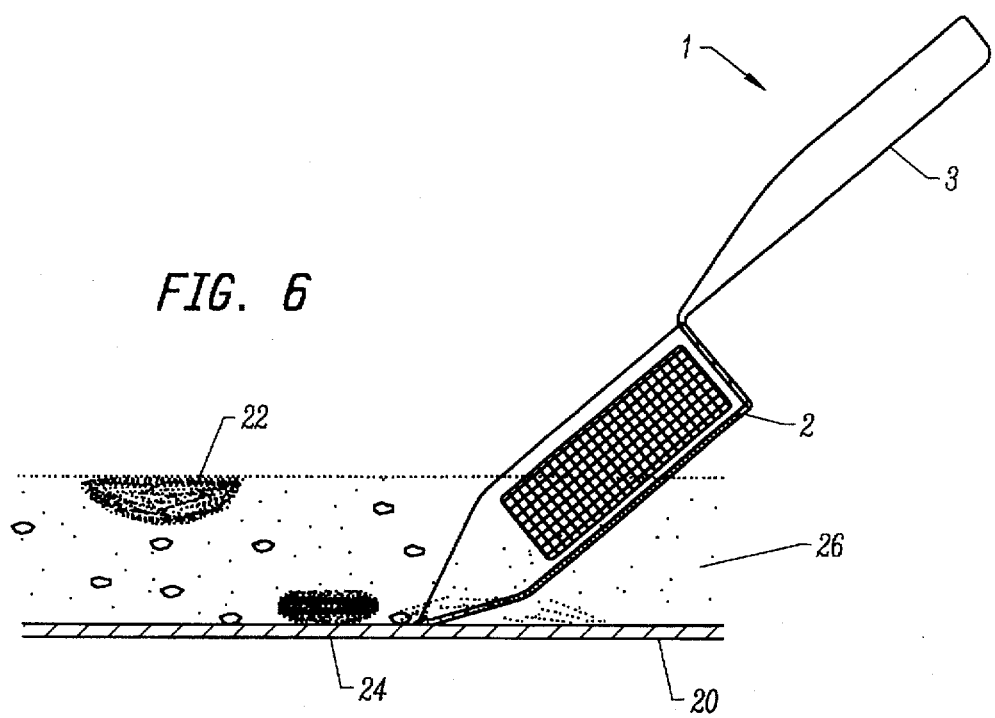
FIGS. 6–8 show an illustrative example of the use of the cat litter scoop according to the present invention.
Figure 7:
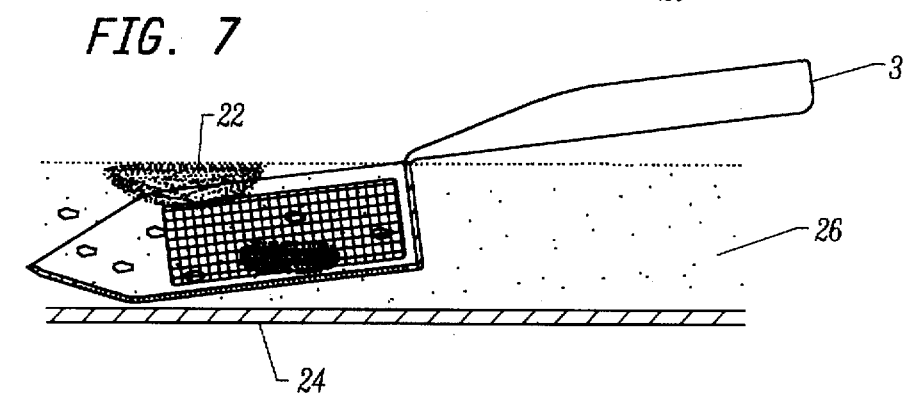
Figure 8:
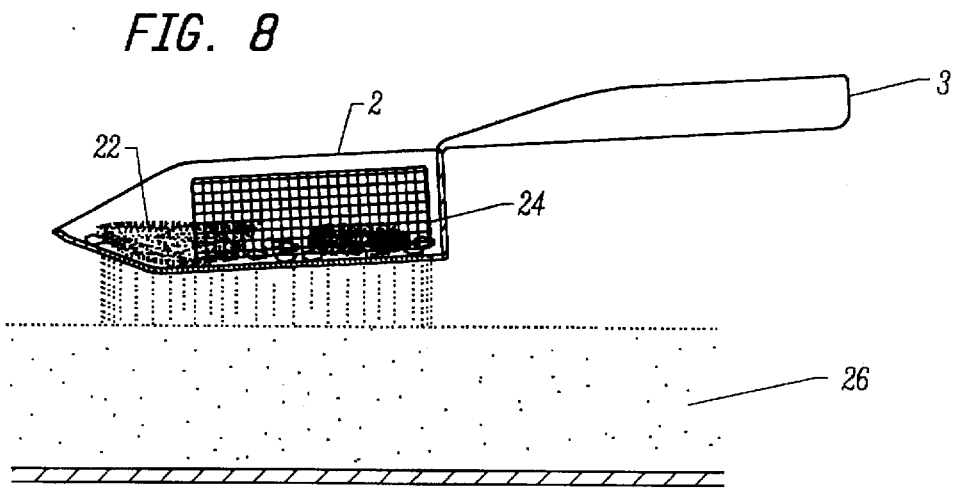

FIGS. 6–8 show an illustrative example of the use of the cat litter scoop according to the present invention. In FIG. 6, the scoop 1 is used with a cat litter container 20 which contains clumped material 22, 24 and scoopable litter 26. The cat litter scoop 1 is used in such a fashion that the first beveled angled edge 5 provides for scrapping clumped or stuck litter from the sides or bottom of the litter box container 20 while the second beveled angle 4 primarily facilitates a smooth rocking movement (together with the first edge 5) to capture litter and remove the captured litter into the basket as lifted, as shown in FIG. 7.

FIG. 8 shows the sifting action provided by the present invention of the litter 26 while moving the captured waste material 22,24 into the basket as lifted.

The foregoing description of the preferred embodiment of the invention has been presented for purposes of illustration and description. It is not intended to be exhaustive or to limit the invention to the precise form disclosed, and many modifications and variations are possible in light of the above teaching. The preferred embodiment was chosen and described in order to best explain the principles of the invention and its practical applications to thereby enable others skilled in the art to best utilize the invention and various embodiments, and with various modifications as are suited to the particular use contemplated. It is intended that the scope of the invention be defined only by the appended claims.

What is claimed is:

1. A cat litter scoop for removing clumped waste material from a cat litter container, said scoop comprising:

a base, including a bottom and sides each having at least a mesh portion for holding and sifting a mixture of cat litter and said clumped material, said mesh portion being of a size sufficiently large enough to allow clean litter to pass through said mesh portion and small enough to prevent said clumped material from falling through said mesh portion, said base being substantially comprised of metal;

an arched handle at a slight angle with respect to the bottom of said base;

a front beveled angled edge of said base for scraping the sides or bottom of said cat litter container;

a second angle at the bottom front of said base angled upwardly to primarily facilitate the scooping of said mixture into said base; and, a smooth top side edge angled to curve smoothly with respect to said front beveled edge to facilitate in cleaning the corners of said cat litter container, and wherein said base is shaped so that the front of said base is wider than the back of said base and the back portion is deeper than the front portion so as to create a funnel-like structure for funneling clumped material from the front edge of said scoop into the deeper main base portion and wherein the depth of said base near the back portion is sufficient so as to prevent the mixture from falling out of said base at the front edge during sifting and wherein the depth is not so large so as the base interferes with the cleaning and sifting of said cat litter container.

2. A cat litter scoop for removing clumped waste material from a cat litter container, said cat litter scoop comprising:

a base, including a bottom having at least a mesh portion of approximately ⅛ inch opening for holding and sifting a mixture of cat litter and said clumped material;

a handle at a slight angle with respect to said base;

a front beveled edge of said base for scraping said cat litter container;

an upwardly angled portion at the bottom front of said base to primarily facilitate the scooping of said mixture into said base;

a smooth top side edge smoothly angled with respect to said beveled edge to facilitate in cleaning of said cat litter container, and wherein said base further includes sides each having at least a mesh portion for holding and sifting said mixture of cat litter and said clumped material and wherein the back portion of said base is substantially solid and wherein the depth of said base near the back portion is sufficient so as to prevent the mixture from falling out of said base at the front edge during sifting and wherein the depth is not so lame so as the base interferes with the cleaning and sifting of said cat litter container.

3. The scoop as in claim 2 wherein said base is substantially comprised of metal.

4. A cat litter scoop for removing clumped waste material from a cat litter container, said scoop comprising:

a base, including a bottom and sides each having a window type mesh portion for holding and sifting a mixture of cat litter and said clumped material, said mesh portion being of a size sufficiently large enough to allow clean litter to pass through said mesh portion and small enough to prevent said clumped material from falling through said mesh portion, said base being substantially comprised of metal and wherein the back portion of said base is substantially solid;

a rounded arched handle at a slight angle with respect to the bottom of said base;

a front beveled angled edge of said base for scraping the sides or bottom of said cat litter container;

a second upwardly angle at the bottom front of said base to primarily facilitate the scooping of said mixture into said base;

a smooth top side edge smoothly angled with respect to said front beveled edge to facilitate in cleaning the corners of said cat litter container, and wherein said base is shaped so that the front of said base is wider than the back of said base and the back portion is deeper than the front portion so as to create a funnel-like structure for funneling clumped material from the front edge of said scoop into the deeper main base portion wherein the depth of said base near the back portion is sufficient so as to prevent the mixture from falling out of said base at the front edge during sifting and wherein the depth is not so large so as the base interferes with the cleaning and sifting of said cat litter container.

* * * * *